United States Patent [19]
Bier et al.

[11] 3,756,104
[45] Sept. 4, 1973

[54] CUTTING OF GLASS

[75] Inventors: David A. Bier, Meadowlands; Edward W. Curtze, Pittsburgh, both of Pa.

[73] Assignee: PPG Industries, Inc., Pittsburgh, Pa.

[22] Filed: June 23, 1972

[21] Appl. No.: 265,923

Related U.S. Application Data

[63] Continuation of Ser. No. 68,305, Aug. 31, 1970, abandoned.

[52] U.S. Cl. ............................. 83/8, 83/12, 225/2, 225/96
[51] Int. Cl. ........................................... B26d 3/08
[58] Field of Search ...................... 83/6, 8, 12, 487, 83/488, 489, 428; 225/2, 96, 96.5

[56] References Cited
UNITED STATES PATENTS

| | | |
|---|---|---|
| 3,282,140 | 11/1966 | Sasabuchi et al. .................. 83/12 X |
| 3,439,849 | 4/1969 | Matsuzaki et al. .................. 225/96.5 |
| 3,474,944 | 10/1969 | Chatelain et al. ....................... 225/2 |
| 3,581,615 | 6/1971 | Kaneshige et al. ..................... 83/6 X |

*Primary Examiner*—Frank T. Yost
*Attorney*—Thomas F. Shanahan

[57] ABSTRACT

Cutter heads in a glass-cutting machine are actuated, using a constant-reluctance motor means. Score lines of predetermined depth are obtained, despite small variations in the thickness of the glass, and without use of a pneumatic system that is slow-acting and difficult to maintain. The pressure exerted by the cutter head responds rapidly to changes in the d-c potential supplied to the motor means, making it possible to vary the depth of the score as desired during the making of a pattern cut, which could not be done with the pneumatic or spring-loaded means of the prior art.

10 Claims, 5 Drawing Figures

Patented Sept. 4, 1973 3,756,104

INVENTORS
DAVID A. BIER
EDWARD W. CURTZE

BY
Chisholm and Spencer
ATTORNEYS

CUTTING OF GLASS

This is a continuation of application Ser. No. 68,305, filed Aug. 31, 1970, now abandoned.

BACKGROUND OF THE INVENTION

1. Field of the Invention

This invention relates to the cutting of glass.

2. Description of the Prior Art

Various equipment is known for the cutting of glass, such as U. S. Pat. Nos. 3,107,834; 3,146,926; 3,151,794; and 3,253,756. In none of the foregoing is there used the concept of actuating a cutter head by means of a motor that exerts upon the glass being cut a force that remains substantially constant or is varied at will in a desired and predetermined manner because of the use of a constant-reluctance motor means. Instead, as has been usual in the art of cutting glass, the cutter head is urged against the glass either by spring-loaded means or by means of a pneumatic cylinder. Both spring-loaded means and pneumatic-cylinder means have substantial drawbacks. Spring-loaded means are not capable of being adjusted readily while a cut is in progress, e.g., in the cutting of a shape such as a windshield blank, so as to exert greater or lesser pressure and generate a score of greater or lesser depth, respectively, in the vicinity of a corner. Pneumatic means have the drawbacks that they are costly to install and maintain and that they are relatively slow-acting, so that it is not ordinarily possible with such pneumatic means to change, as desired, the intended depth of the score.

The concept of electrically or electromagnetically actuating a cutter head that is used in the cutting of glass is not novel. It is known, for example, from Drake U. S. Pat. No. 1,856,128 or Insolio U. S. Pat. No. 3,276,302, to use for the cutting of glass a cutter head that is actuated electromagnetically. The problem, however, with the devices of the prior art has been that it is difficult to control the amount of force exerted by the cutter head upon the glass. It is by no means unusual for the thickness of the glass being cut to vary by a few thousandths of an inch, yet even such relatively small variations, in the cutting of pieces of glass having a thickness between 2 and 10 millimeters, is likely to lead to considerable variations in the depth of the score. There has been, of course, the possibility of using in the vicinity of the cutter wheel a reference wheel that is intended to ride upon the upper surface of the glass being scored, but it has ordinarily been impossible to arrange for any variation in the spacing between such reference wheel and the cutter wheel while a cut is in progress, since means sufficiently fast-acting to permit such adjustment to be made in the depth of the score being produced has been unknown, prior to the instant invention.

It may be considered that direct-current torque motors are, per se, already known. Such devices comprise a rotor of permanent-magnet material of high permeability, suitably keyed to a shaft. In operative association with the rotor of permanent-magnet material, there are provided a plurality of coils actuated by a variable-magnitude direct-current source, such that when current is fed to the coils, there is a tendency for the above-mentioned rotor to assume a "home" position, and such that whenever the above-mentioned rotor is away from said home position, there is exerted upon the above-mentioned shaft a torque proportional to the magnitude of the direct-current potential provided to the above-mentioned coils.

SUMMARY OF THE INVENTION

Cutter heads in a glass-cutting machine are actuated, using a constant-reluctance motor means. Score lines of predetermined depth are obtained, despite small variations in the thickness of the glass, and without use of a pneumatic system that is slow-acting and difficult to maintain. The pressure exerted by the cutter head responds rapidly to changes in the d-c potential supplied to the motor means, making it possible to vary the depth of the score as desired during the making of a pattern cut, which could not be done with the pneumatic or spring-loaded means of prior art.

DESCRIPTION OF THE DRAWINGS

A complete understanding of the invention may be had from the foregoing and following description thereof, taken together with the appended drawings, in which.

DESCRIPTION OF THE PREFERRED EMBODIMENT

Figure 1:
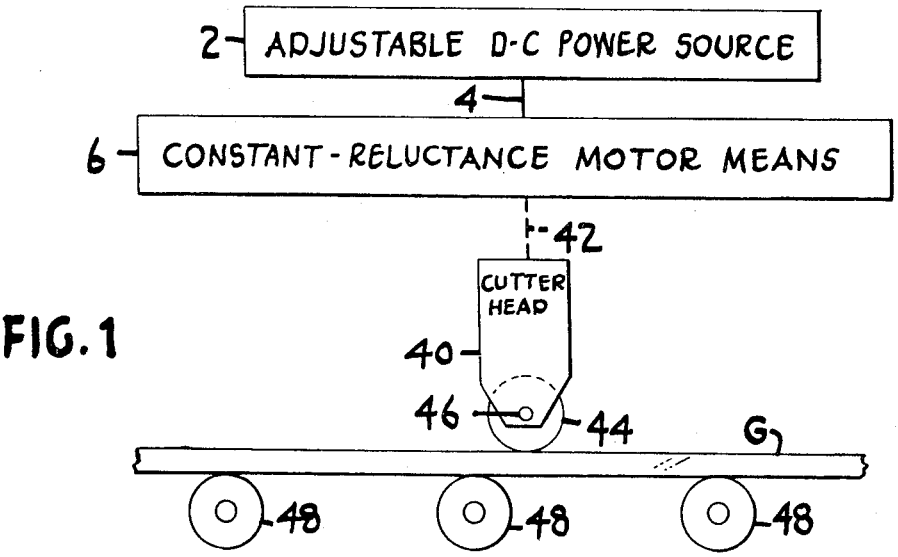
FIG. 1 is a schematic diagram, indicating the invention in its broadest aspect.

Referring to FIG. 1, there is indicated in block 2 an adjustable direct-current power source, such as a combination of battery and rheostat.

As indicated at 4, such a power source is connected to a constant-reluctance motor means 6. Preferably, but not necessarily, the constant-reluctance motor means 6 comprises a direct-current torque motor of the general kind indicated in FIG. 2.

Figures 2, 3, 4:
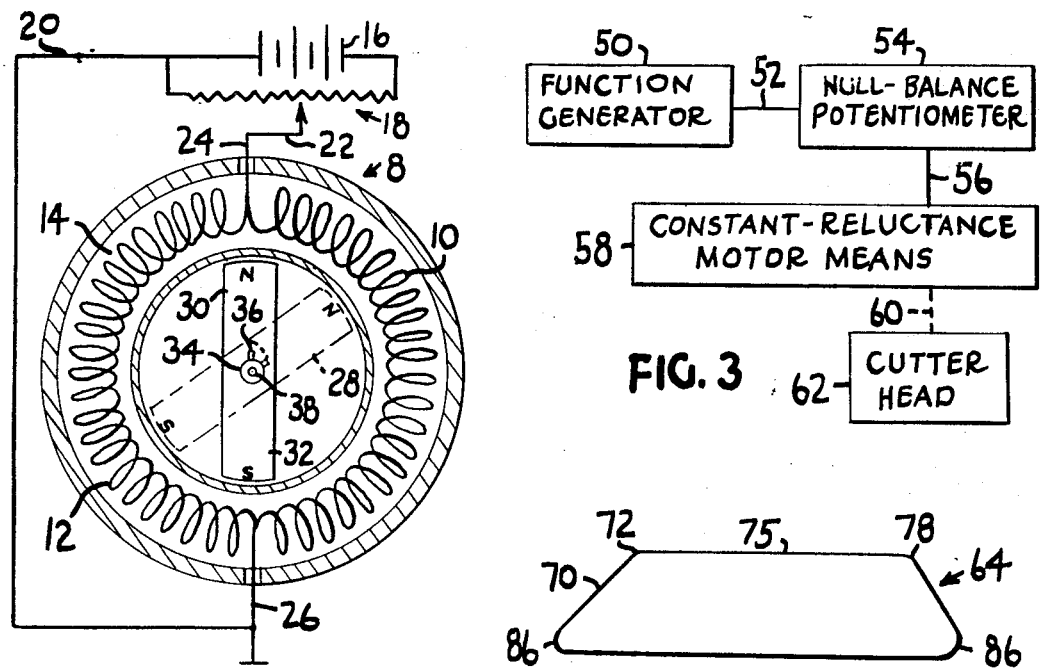
FIG. 2 is a detailed view, indicating one particular constant-reluctance motor means for use in the invention as described in FIG. 1.
FIG. 3 comprises a block diagram of an embodiment of the invention.
FIG. 4 represents the outline of a light of a vehicle.

Referring to FIG. 2, a direct-current torque motor, indicated generally as 8, may be considered as comprising a pair of coils 10, 12 contained within a suitable housing 14. Direct electrical current is fed from a source 16 through a rheostat 18, the output lines 20, 22 of which are connected to the taps 24, 26 of the coils 10, 12. The passage of direct current through the coils 10, 12 generate within the motor 8 a suitable electrical field, tending to influence the location of the rotor 28, which is made of permanent-magnet material such as an Alnico alloy of high energy product and has, as indicated, a north pole 30 and a south pole 32. The rotor 28 has centrally thereof an opening 34 containing as least one keyway 36. When the rotor 28 is in the position indicated in dash-dot lines in FIG. 2, and direct-current electrical power is supplied through the taps 24, 26, there is exerted upon the rotor 28 a suitable force that tends to turn the rotor 28 to the position indicated in solid lines in FIG. 2.

Those skilled in the art will understand how it is possible to position within the opening 34 a keyed shaft 38, providing the shaft 38 with suitable bearings in the vicinity of its ends and associating operatively with the shaft 38 a fork or yoke (not shown) that cooperates with a suitable key of the shaft 38 and exerts, as necessary, a force upon a cutter head 40.

Referring to FIG. 1, there is indicated at 42 an operative connection between the constant-reluctance motor means 6 and the cutter head 40, and this connection may be of the kind indicated above, or it may be of a different kind, such as will suggest itself to a person of ordinary skill in the art.

Cutter head 40 comprises a cutter wheel 44, which may, for example, be made of sintered tungsten carbide or other wear-resistant and hard material, possibly having some diameter such as 10 millimeters or less and a cutter angle such as about 140° or less, with the wheel 44 being journaled for rotation about an axis or shaft indicated at 46. The wheel 44 comes into contact with a sheet of glass G to be cut or scored with the glass G being supported on a plurality of rollers 48, suitably driven by suitable means (not shown).

Figure 5:
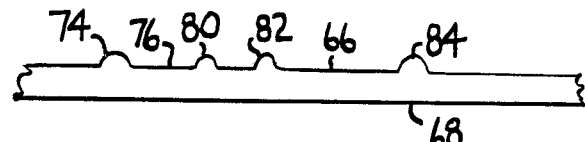
FIG. 5 is a graph indicating variations in the voltage applied to a constant-reluctance motor means in accordance with the invention in the scoring of a sheet of glass to produce the light of FIG. 4.

Referring now to FIG. 3, there is indicated a combination of equipment particularly suited for the cutting of a shaped or patterned piece of glass, such as that shown in FIG. 4. The apparatus shown in FIG. 3 comprises a function generator 50, connected as indicated at 52 to a null-balance potentiometer 54, which is connected as indicated at 56 to a constant-reluctance motor means 58, which may be of the general kind indicated above. The constant-reluctance motor means as indicated is connected operatively at 60 to a cutter head 62 used, as was the cutter head 40, for the scoring of a piece of glass. In the cutting of a blank for a windshield, sidelight or backlight, possibly having a shape such as that indicated in FIG. 4, there is produced by the function generator 50 a direct-current potential such as that indicated by the line 66 in FIG. 5. In FIG. 5, line 68 indicates a basis or zero potential. The piece 64 as shown in FIG. 4 may be cut or broken from a larger piece of glass containing the same, and quite appropriately, if the cutter head 62 is so operated as to start, for example, at the location indicated at 70 in FIG. 4, and the corner indicated in 72 is then cut with there being used an appropriately increased pressure by the cutter head 62 upon the glass, such as may be produced by the increase in the signal on the line 52 indicated by the hump at 74 in the line 66. Then, as the cutter head traverses the portion 75 of the piece 64, the function generator 50 produces the portion 76 of the line 66, with the pressure exerted by the cutter head 62 upon the glass being increased as the portion in the vicinity of corner 78 is being cut, as is indicated by the hump 80 in the line 66. Similarly, the humps 82 and 84 correspond to the corners 86 and 88 of the piece 64.

Those skilled in the art will understand that, in most instances, it is essential that the force exerted by the cutter head upon the glass be on the order of 10 pounds or more, and preferably about 20 pounds or more, in order that a score of suitable depth may be obtained. If the wheel contained in the cutter head is somewhat sharper, it will in some instances be possible to use a lesser pressure. On the other hand, it is desirable not to use a pressure so great as to cause immediate fracturing of the glass being cut throughout its thickness.

For the most part, it is desirable that the score be made (except when the cross-cutting of a glass ribbon, complete with edge portions and/or edge bulbs, is being practiced) to be located at a suitable distance with respect to the edge of the piece being scored for cutting, such as a minimum of six or eight times the thickness of the glass.

The invention is of especial usefulness in connection with the cutting of a large sheet or ribbon of glass into a plurality of segments by means of a plurality of cutter heads located upon a cutter bar. In accordance with prior-art practices, it has hitherto been considered necessary either to use a pneumatic system, with its attendant dangers of the kinking or the wearing of the cords or lines connecting the pneumatic supply source to the cutter heads, or to use a spring-loaded apparatus, with its attendant difficulty that it is inconvenient to adjust the spring means associated with each of the cutter heads so that a score line of adequate and desired depth is obtained.

Although the invention has been described in connection with a direct-current torque motor, it will be apparent to those skilled in the art that other suitable constant-reluctance motor means may be devised and used. What is required is that there be provided an electrical or magnetic means that operates on the basis of a substantially constant air gap and a substantially constant environment of magnetic permeability. This is to be distinguished from the use of an electromagnet or solenoid, where the air gap goes from a substantial value such as 3 millimeters or more to substantially zero, possibly with occasional excursions thereafter of up to 1 or 2 millimeters. With the use of such equipment, it is substantially impossible to exert a constant force, as is contemplated in accordance with the principles of the instant invention.

Those skilled in the art of cutting glass will appreciate from the foregoing disclosure that remarkable novel effects can be obtained if a series of sheets or a moving ribbon is cut by means of sets of cutters of the kind taught above that operate, one set transversely of the glass in its travel and one set longitudinally, with the positioning of the cutter heads being automatically controlled and with the cutter heads being raised or lowered at precisely chosen moments. The actuation is so quick and precise that it becomes possible to envision using interrupted-cut practices that were hitherto impractical. The losses, in changing from one pattern of cutting to another, are much reduced. With the faster and more reliable action obtained with the present invention, it is possible to cut more closely around a defect, so that less glass is discarded. The cutting of flat glass to meet a customer's size specifications may be accomplished substantially more efficiently, rapidly and conveniently when the instant invention is practiced.

We claim as our invention:

1. An apparatus for cutting glass comprising, in combination, an adjustable source of current,
    a constant-reluctance motor means operatively connected to said source of current, and
    cutter-head means comprising a cutter wheel for scoring said glass operatively connected to said constant-reluctance motor means to move said cutter wheel in a direction that intersects a major surface of said glass.

2. Apparatus as defined in claim 1, characterized in that said constant-reluctance motor means is operatively connected to an adjustable source of direct current.

3. Apparatus as defined in claim 2, characterized in that said constant-reluctance motor means comprises a direct-current torque motor.

4. Apparatus as defined in claim 1, said apparatus being further characterized in that said current source comprises a function generator and a null-balance potentiometer operatively connected therewith.

5. Apparatus for cutting glass comprising, in combination, a motor means including a movable member therein,
  means for moving said member solely within the constant-reluctance range of said motor, and
  cutter-head means comprising a cutter wheel for scoring said glass operatively connected to said constant-reluctance motor means to move said cutter wheel in a direction that intersects a major surface of said glass.

6. Apparatus as defined in claim 5, said apparatus being further characterized in that said motor means comprises a direct-current torque motor.

7. Apparatus as defined in claim 5, said apparatus being further characterized in that said means for moving said member comprises a function generator and a null-balance potentiometer operatively connected therewith.

8. A method of producing a score line upon a sheet of glass, said score line being of predetermined depth at predetermined locations along the extent of said score line, said method comprising the step of activating a substantially constant-reluctance motor means that is operatively associated with a cutter wheel means to move said cutter wheel means in a direction that intersects a major surface of said glass.

9. A method as defined in claim 8, said method being further characterized in that said score line forms a closed loop, said substantially constant-reluctance motor means being operated so as to produce in portions thereof corresponding to the corners of said loop a score having a greater depth than said score exhibits in the remaining portions of said loop.

10. A method as defined in claim 8, characterized in that said substantially constant-reluctance motor means comprises a direct-current torque motor.

* * * * *